(12) United States Patent
Craciun et al.

(10) Patent No.: US 8,372,516 B2
(45) Date of Patent: Feb. 12, 2013

(54) (METH)ACRYLATE PHOSPHONIC ESTERS AS ADHESION PROMOTERS

(75) Inventors: Liliana Craciun, Carmel, NY (US); Ying Dong, Tarrytown, NY (US); Orest Polishchuk, Bayonne, NJ (US); Christopher Koenigsmann, Mahopac, NY (US); Belinda W. Ho, New Milford, CT (US)

(73) Assignee: BASF SE, Ludwigshafen (DE)

( * ) Notice: Subject to any disclaimer, the term of this patent is extended or adjusted under 35 U.S.C. 154(b) by 622 days.

(21) Appl. No.: 12/582,862

(22) Filed: Oct. 21, 2009

(65) Prior Publication Data

US 2010/0112362 A1    May 6, 2010

Related U.S. Application Data

(60) Provisional application No. 61/197,867, filed on Oct. 31, 2008.

(51) Int. Cl.
   B32B 15/08      (2006.01)
   C03C 25/10      (2006.01)
   C07C 49/84      (2006.01)
   C08F 2/50       (2006.01)

(52) U.S. Cl. ............ 428/461; 428/463; 522/36; 522/42; 522/44; 558/179

(58) Field of Classification Search .................. 428/461, 428/463; 522/36, 42, 44; 558/179
   See application file for complete search history.

(56) References Cited

U.S. PATENT DOCUMENTS

| | | | |
|---|---|---|---|
| 2,934,555 A | 4/1960 | O'Brien et al. | |
| 3,030,347 A | 4/1962 | O'Brien et al. | |
| 4,029,679 A | 6/1977 | Kotzsch et al. | |
| 4,526,728 A | 7/1985 | Finke et al. | |
| 4,658,003 A | 4/1987 | Schmidt et al. | |
| 4,738,870 A | 4/1988 | Green et al. | |
| 5,532,112 A * | 7/1996 | Kohler et al. | 430/281.1 |
| 6,436,475 B1 | 8/2002 | Adler et al. | |
| 6,740,173 B1 | 5/2004 | Pouyfaucon et al. | |
| 7,642,296 B2 * | 1/2010 | Husler et al. | 522/6 |
| 2003/0023107 A1 * | 1/2003 | Riondel et al. | 558/179 |
| 2006/0228481 A1 * | 10/2006 | Gros et al. | 427/299 |
| 2008/0194730 A1 | 8/2008 | Klee et al. | |

OTHER PUBLICATIONS

International Search Report dated Mar. 31, 2010.
Database WPI Week 19934, Thomson Scientific, London, GB; AN 1993-269891, XP002572346 & JP 05 186620 A (Mitsubishi Rayon Co Ltd) Jul. 27, 1993 abstract.
Database WPI Week 198717, Thomson Scientific, London, GB; AN 1987-122421, XP002572347 & JP 08 225585 A (Dow Chem Co) Apr. 14, 1987.
Bressy-Brondino, C. et al, Journal of Applied Polymer Science 2002, 83(11), 2277-2287.

* cited by examiner

*Primary Examiner* — Kevin R Kruer
(74) *Attorney, Agent, or Firm* — Shruti Costales; Shiela A. Loggins

(57) ABSTRACT

The invention is directed to compositions on a surface which comprise a) at least a (meth)acrylate prepolymer,
b) an adhesion promoting monomer of formula (I)

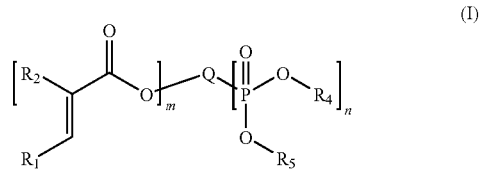

wherein Q, $R_1$, $R_2$, $R_4$, $R_5$, m and n are defined herein. Further the compositions may be used to improve the adhesion to surfaces, especially metallic surfaces and may include additional optional components such as adhesion promoting photoinitiators.

8 Claims, No Drawings

(METH)ACRYLATE PHOSPHONIC ESTERS AS ADHESION PROMOTERS

The application claims the benefit of U.S. Provisional Ser. No. 61/197,867, filed on Oct. 31, 2008 herein incorporated entirely by reference.

The present invention is directed to the use of (meth)acrylate phosphonic esters in various prepolymer systems for the purpose of improving adhesion of the formed resin to metal surfaces.

BACKGROUND OF THE INVENTION

The use of phosphorus-containing materials as flame retardants, corrosion inhibitors, adhesion promoters, and scale inhibitors is well known. Conventional phosphorus-containing additives are non-polymerizable and suffer from several drawbacks such as migration and leaching, leading to modification of adhesive, coating or film properties over time. Commercially available phosphorus-containing monomers, such as vinylphosphonic acid and ethylphosphonic acid monovinyl ester exhibit a reduced tendency for polymerization and give polymers with low molecular weight.

Commercially available alkylphosphates containing (meth)acrylic functionalities show reduced hydrolytic stability, as the phosphate or methacrylate ester bond can be cleaved in the presence of water. This reduces their storage stability and limits their applications.

(Meth)acrylic phosphonic acids and esters are known to be more hydrolytically stable than analogous phosphate acids and esters. These monomers are also known for their flame retardant and scale inhibiting activities.

For example, U.S. Pat. Nos. 3,030,347 and 2,934,555 teach dialkylphosphonoalkyl acrylate and methacrylate copolymers and methods for preparation. The compounds are used in leather or textile finishes for imparting flame retardancy.

U.S. Pat. No. 4,526,728 discusses phosphonate monomers for dyeing auxiliaries and scale inhibitors.

U.S. Published Application No. 2008/194730 discloses self-priming dental adhesive compositions containing phosphonic acid moieties. The invention alleges adhesion to enamel and/or dentin with a bond strength of at least 8 Mpa.

U.S. Pat. No. 4,029,679 discloses phosphonate monomers as a metal primer.

U.S. Pat. No. 6,740,173 discloses the use of phosphonate oligomer and phosphonate monomers (phosphonated methacrylates) in a composition for preventing metal corrosion with binder and metal reactive additives.

Bressy-Brondino, C. et al, Journal of Applied Polymer Science 2002, 83(11), 2277-2287, discloses blends of poly (vinylidene fluoride) and copolymers of methyl methacrylate and dimethyl 2-methylacryloyloxyethylphosphonate as a coating on steel.

U.S. Pat. No. 6,436,475 discloses a process for treating zinc, magnesium or aluminum wherein an organic compound with at least one phosphoric or phosphonic acid group is applied onto the metallic surface.

U.S. Pat. Nos. 4,738,870 and 4,658,003 disclose hydroxyphosphinylalkyl(meth)acrylates as adhesion promoting monomers.

There is still a need for hydrolytically stable phosphorus-containing monomers, which may be easily incorporated into resin based coatings, films and adhesives by simple blending of the phosphorus-containing monomer with at least one curing agent and curing resin. Surprisingly, more hydrolytically stable phosphonate-based compositions show also superior adhesion to metals.

SUMMARY OF THE INVENTION

The invention encompasses a coating, film or adhesive on a surface, which coating, film or adhesive comprises
a) at least a (meth)acrylate prepolymer,
b) an adhesion promoting monomer of formula (I)

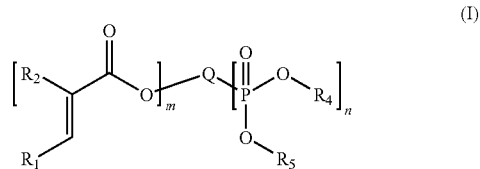

(I)

Q is at least a divalent linking radical selected from the group consisting of one or more of a linear or branched $C_1$-$C_{10}$ alkyl, linear $C_1$-$C_{18}$ alkylene, $C_6$-$C_{12}$ arylene, or linear or branched aralkylene;
wherein the linear or branched $C_1$-$C_{10}$ alkyl, $C_6$-$C_{12}$ arylene, linear or branched aralkylene; linking group is unsubstituted or substituted by one or more $C_1$-$C_4$ alkyl, $C_1$-$C_4$ haloalkyl, halogen, hydroxyl or $C_1$-$C_4$ alkoxy;
or
Q is a $C_2$-$C_{12}$ alkylene interrupted by one or more —O—, —S—, —O(CO)—, —S(CO)—, —OC(O)O—, or —C(O)—;
m is 1 to 2;
n is 1 to 2;
$R_1$ and $R_2$ are independently hydrogen or linear or branched $C_1$-$C_4$ alkyl;
$R_4$ and $R_5$ are independently hydrogen or linear or branched $C_1$-$C_4$ alkyl; and
c) a curing agent.

Q must be linked directly via a carbon atom to the phosphorus atom in formula (I).

The (meth)acrylate prepolymer is preferably an epoxy resin or an aliphatic urethane containing (meth)acrylate functionalities or mixtures thereof. The epoxy resin for example, also contains (meth)acrylate moeties.

$R_4$ and $R_5$ are for example independently linear or branched $C_1$-$C_4$ alkyl groups or hydrogen. For example, $R_4$ or $R_5$ are hydrogen or at least one of $R_4$ or $R_5$ is hydrogen.

Q is preferably $C_3$-$C_{18}$ alkylene.

For example, when the prepolymer is an aliphatic urethane containing (meth)acrylate functionality, Q is $C_3$-$C_{18}$ alkylene, $C_3$-$C_{12}$ alkylene, $C_3$-$C_{10}$ alkylene, $C_3$-$C_8$ alkylene or $C_3$-$C_6$ alkylene.

The invention also encompasses a surface at least partially covered with a cured coating, film or adhesive formed from components a), b), and c). The at least partially covered surface or substrate, preferably excludes dentine enamel.

The surface is preferably a metal such as aluminum or steel. The surface is immediately adjacent to a coating layer which coating layer comprises the coating, film or adhesive containing a), b) and c).

Furthermore, the metal surface may be rigid or flexible. Applications which require a flexible surface may be coil coatings.

Coil coatings involves the application of an organic resin to a flat metal surface. The metal is, for example, aluminum or steel. In the process, a metal coil is unwound, cleaned, treated, primed, cured, treated with a top coat, cured and rewound. When the metal roll reaches the customer, it is uncoiled and fashioned into the end product. The end product is, for example, a roof or building facade, office furniture, filing cabinets, appliances, or the hood or door of a car. The severe stress that is placed upon a coil coating as it is rolled for storage and shipment, then flattened, cut, shaped, and fastened, requires that the coating be durable. Durability is also required throughout the lifetime of the metal object, which may be in an outdoor application exposed to moisture, sunlight, and various chemicals in the atmosphere. Excellent adhesion of primer layer, which is a clear or slightly pigmented resin, is vital to acceptable performance of coatings over metal during manufacture and throughout the usable lifetime of the end product.

The adhesion promoting monomer described by formula (I) is used to improve adhesive properties of a coating, film or adhesive. Adhesion promotion by the monomer described by formula (I) may be accomplished in a number of ways. For example, a suitable surface may be treated with the adhesion promoting monomers of formula (I) followed by application of a curable prepolymer to said treated surface and curing.

Alternatively, the adhesion promoting monomers of formula (I) may be dissolved in a solvent before treatment of the surface followed by application of the curable prepolymer to said treated surface and curing.

The adhesion promoting monomers of formula (I) may also be combined with a prepolymer forming a composition which is then applied to a surface and curing.

Another alternative is the monomer of formula (I) may be polymerized to form a prepolymer or oligomer which is then added directly to other oligomers or resins containing ethylenic unsaturation, such as (meth)acrylates, and adhesion promoters and photoinitiators.

Thus the invention also encompasses several methods:

A method of improving the adhesion of a coating, film or adhesive to a surface which method comprises the steps of:
i) treating the surface with the adhesion promoting monomer of formula (I) defined above, applying a composition comprising a (meth)acrylate prepolymer and curing agent to said treated surface;
or
applying a composition comprising the adhesion promoting monomer of formula (I) defined above, a (meth)acrylate prepolymer and curing agent to the surface;
or
polymerizing the adhesion promoting monomer of formula (I) defined above to form an adhesion promoting oligomer, adding the oligomer to a (meth)acrylate prepolymer, and
ii) curing.

The curing agent is preferably a photoinitiator.

DETAILED DESCRIPTION OF THE INVENTION

Definitions

Molecular weight for purposes of the invention means weight average molecular weight ($M_w$).

The term "monomer" for purposes of the invention refers to an ethylenically unsaturated compound capable of being polymerized.

The term "monomer unit" for purposes of the invention refers to the incorporation of the monomer into a polymer after polymerization.

References to "percent" are based on weight percent of the total weight of a composition unless otherwise specified.

"Prepolymer" for purposes of the invention means a reactive, low molecular weight macromolecule, capable of further polymerization.

"Adhesion-promoting oligomer" for purposes of the invention means an oligomer formed from the monomer of formula (I). This oligomer may include other monomers but preferably is formed from only a monomer or mixture of monomers of formula (I).

The term "oligomer" is for example a polymer molecule but consists of only a few monomer units such as dimer, trimer and tetramer.

(Meth)acrylate encompasses methacrylate and acrylate derivatives.

Adhesion promoting monomer of Formula (I)

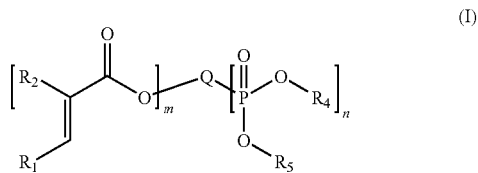

Q is at least a divalent linking radical selected from the group consisting of one or more of a linear or branched $C_1$-$C_{10}$ alkyl, linear $C_1$-$C_{18}$ alkylene, $C_6$-$C_{12}$ arylene, or linear or branched aralkylene;

wherein the linear or branched $C_1$-$C_{10}$ alkyl, $C_6$-$C_{12}$ arylene, linear or branched aralkylene; linking group is unsubstituted or substituted by one or more $C_1$-$C_4$ alkyl, $C_1$-$C_4$ haloalkyl, halogen, hydroxyl or $C_1$-$C_4$ alkoxy;

or

Q is a $C_2$-$C_{12}$ alkylene interrupted by one or more —O—, —S—, —O(CO)—, —S(CO)—, —OC(O)O—, or —C(O)—;

m is 1 to 2;

n is 1 to 2;

$R_1$ and $R_2$ are independently hydrogen or linear or branched $C_1$-$C_4$ alkyl;

$R_4$ and $R_5$ are independently hydrogen or linear or branched $C_1$-$C_4$ alkyl;

$C_1$-$C_{18}$ alkylene is linear and is, for example, $C_1$-$C_4$, $C_1$-$C_6$, $C_1$-$C_8$, $C_1$-$C_{10}$, $C_1$-$C_{12}$, $C_1$-$C_{14}$, $C_1$-$C_{16}$.

Examples are methylene, ethylene, propylene, butylene, pentylene, hexylene, heptylene, octylene, nonylene, decylene, undecylene and dodecylene. Further examples are $C_1$-$C_8$ alkylene, $C_1$-$C_6$ alkylene or $C_2$-$C_6$ alkylene, $C_1$-$C_4$ alkylene or $C_2$-$C_4$ alkylene.

Q may for example be $C_3$-$C_{18}$. Specific examples are —CH$_2$CH$_2$CH$_2$—, —CH$_2$CH$_2$CH$_2$CH$_2$—, —CH$_2$CH$_2$CH$_2$CH$_2$CH$_2$— and —CH$_2$CH$_2$CH$_2$CH$_2$CH$_2$CH$_2$—.

Q may for example be linear or branched $C_1$-$C_{10}$ alkyl. For example —CH$_2$CH(CH$_3$)CH$_2$—, (—CH2CH2)$_2$C(CH2CH2-)$_2$ or —CH2CH2CH(CH2 CH2-)$_2$.

An example of formula (I) wherein the linking group Q is branched is as below.

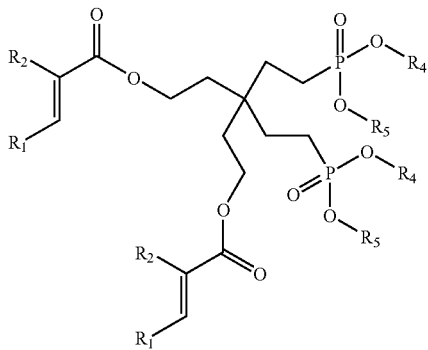

Q may for example be bivalent, trivalent or tetravalent. When n is 1 and m is 1 formula (I') is

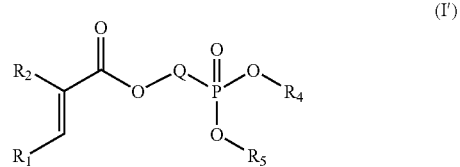

(I')

While not wishing to be bound by theory, it is believed that at least a $C_3$ or greater alkylene linking group improves adhesion of the coating, film, or adhesive because it makes the phosphonic acid group more readily available to attach to a metal surface. A long spacer brings flexibility to the "anchoring" group by distancing it from the polymer backbone and allowing it to position properly for bonding with the metal. In addition, a longer spacer increases the stability of the P—C linkage towards hydrolysis.

$C_1$-$C_4$ alkoxy is, for example, methoxy, ethoxy, propoxy, and butoxy, it being possible for the alkyl radicals in alkoxy groups to have more than two carbon atoms and to be branched.

$C_2$-$C_{12}$ alkylene interrupted by one or more —O—, —S—, —O(CO)—, —S(CO)—, —OC(O)O—, —C(O)—O— or —C(O)— groups may be for example interrupted once or several times by —O—. For example, it may be interrupted from one to five times, for example from one to three times or once or twice, by non-successive —O—. Accordingly, resulting structural units are for example: —$CH_2$—O($CH_2$)$_2$O—$CH_2$—, —$CH_2$—O—$CH_2$—, and —$CH_2CH_2$—O—$CH_2CH_2$—.

$C_6$-$C_{12}$ arylene is, for example, o-, m- or p-phenylene, 1,4-naphthylene or 4,4'-diphenylene. Other examples of arylene are phenylene, naphthylene, biphenylene, biphenylene ether and anthracenylene.

The term "aralkylene group" is for example benzylene in which both the aliphatic hydrocarbon group and aromatic hydrocarbon group may be unsubstituted or substituted. The aralkylene may be unsubstituted or substituted by $C_1$-$C_4$ alkyl or $C_1$-$C_4$ alkoxy, or polyoxyalkylene having 2 to 12 oxyalkylene units and 2 to 6 C atoms in the alkylene.

The term "halogen" means fluorine, chlorine, bromine and iodine.

$C_1$-$C_4$ alkyl is typically linear or branched. For example, $C_1$-$C_4$ alkyl may be methyl, ethyl, n-propyl, isopropyl, n-butyl, sec-butyl, isobutyl or tert-butyl.

$C_1$-$C_4$ haloalkyl are $C_1$-$C_4$-alkyl mono- or poly-substituted by halogen, for example, from one to three or one or two halogen substituents at the alkyl radical. Examples are chloromethyl, trichloromethyl, difluoromethyl, trifluoromethyl or 2-bromopropyl.

Examples of $C_1$-$C_4$ alkoxy are methoxy, ethoxy, n-propoxy, isopropoxy, n-butoxy, sec-butoxy, isobutoxy or tert-butoxy.

The adhesion promoting monomer of formula (I) is added to the coating, film or adhesive composition in wt. % amounts that range from about 0.1 to about 20 wt. %, about 0.5 to about 10 wt. %, or about 1 wt. % to about 10 wt. %.

When treating a surface with the adhesion promoter of formula (I) before laying down a prepolymer composition, the adhesion promoter may for example be dissolved in a solvent and applied directly to the surface. In this case, the adhesion promoting monomer may make up anywhere from 0.1 to 50 wt. % of the solution.

Furthermore, it is possible to treat the surface with the adhesion promoting monomer and add additional adhesion promoting monomer to the prepolymer and cure.

Polymerizing the adhesion promoting monomer of formula (I) defined above to form an oligomer is also envisioned and then using the oligomer formed as a polymeric additive which may then be combined with a (meth)acrylate prepolymer.

Prepolymerizing the adhesion promoting monomer of formula (I) is advantages in several respects. Firstly, the adhesion promoting polymeric additive is then less likely to leach from the cured polymeric matrix. Secondly, the polymeric additive may be more compatible with the pre-cured and post-cured polymeric matrix.

The Prepolymer

In general all radiation curable oligomers are fitting as the prepolymer. For example, oligomers with a molecular weight of at least 500, for example from about 500 to about 10,000, from about 700 to about 10,000, from about 1,000 to about 8,000, or about 1,000 to about 7,000 are appropriate. For example, urethane oligomers, containing at least one unsaturated group are suitable. For example the radiation curable oligomer may have 2, 3, 4, 5 or 6 terminal functional groups. The coat may contain not only one specific prepolymer or oligomer, but also mixtures of different oligomers. The preparation of suitable oligomers is known to the person skilled in the art and for example published in U.S. Pat. No. 6,136,880, incorporated herein by reference.

Examples of the prepolymers are polyunsaturated compounds such as (meth)acrylated epoxy resins, (meth)acrylated or vinyl-ether- or epoxy-group-containing polyesters, polyurethanes and polyethers.

Also suitable are compounds having one or more free-radical-polymerisable double bonds. The free-radical-polymerisable double bonds in such compounds are preferably in the form of (meth)acryloyl groups. Here and in the following, (meth)acryloyl and (meth)acrylic mean acryloyl and/or methacryloyl, and acrylic and/or methacrylic, respectively. At least two polymerisable double bonds in the form of (meth) acryloyl groups are preferably contained in the molecule. The compounds in question may be, for example, (meth)acryloyl-functional oligomeric and/or polymeric compounds of poly (meth)acrylate. The compounds preferably containing free-radical-polymerisable double bonds in the form of (meth) acryloyl groups can be obtained by customary methods, for example by reaction of poly(meth)acrylates with (meth) acrylic acid. These and further preparation methods are described in the literature and known to the person skilled in the art.

The (meth)acrylate prepolymer component of the radiation curable resin are for example epoxy (meth)acrylates, aliphatic urethane (meth)acrylated, aromatic urethane (meth)acrylates, polyester (meth)acrylates, and acrylic (meth)acrylates.

Blends of the above prepolymers are envisioned. For example, blends of aromatic and aliphatic urethane (meth)acrylates, blends of epoxy(meth)acrylates with aliphatic and/or aromatic urethane (meth)acrylates are possible. The particular blend will be determined by the final application and properties required of the particular application.

Unsaturated oligomers may be unsaturated polyester resins, which are usually produced from maleic acid, phthalic acid and one or more diols and have molecular weights of about from 500 to 3000. In addition it is also possible to use vinyl ether monomers and oligomers, and also maleate-terminated oligomers having polyester, polyurethane, polyether, polyvinyl ether and epoxide main chains. Combinations of vinyl-ether-group-carrying oligomers and polymers, as described in U.S. Pat. No. 5,334,455, incorporated herein by reference, are especially suitable, but copolymers of monomers functionalized with vinyl ether and maleic acid also come into consideration.

Urethane (meth)acrylated oligomers are the preferred prepolymer.

Aliphatic urethanes are particularly good for use in non-yellowing applications where toughness, flexibility and good exterior durability are required.

Aromatic urethane acrylates provide toughness and flexibility in applications that do not require yellowing resistance.

The term "aliphatic urethane acrylate", as used herein, is intended to have its commonly understood meaning in the art, that is a urethane acrylate prepared from an aliphatic diisocyanate or polyisocyanate, i.e., an diisocyanate in which the isocyanate groups are connected by a aliphatic backbone. In one embodiment, for example, the aliphatic urethane acrylate comprises the residues of at least one polyhydroxy compound selected from trimethylolpropane, glycerol, pentaerythritol, and dipentaerythritol. It is also possible to use one or more hexafunctional urethane acrylates and methacrylates wherein the term "hexafunctional" is understood to mean the acrylate comprises oligomers having 6 acrylate ester groups. Examples of commercially available aliphatic urethane acrylates which can be used in the instant invention include, but are not limited to: EBECRYL 244 (aliphatic urethane diacrylate diluted 10% with 1,6-hexanediol diacrylate), EBECRYL 264 (aliphatic urethane triacrylate diluted 15% with 1,6-hexanediol diacrylate), EBECRYL 265 (aliphatic urethane triacrylate with 25% tripropylene glycol diacrylate), EBECRYL 270 (aliphatic urethane diacrylate with less than 10% tripropylene glycol diacrylate), EBECRYL 284 (aliphatic urethane diacrylate diluted 10% with 1,6-hexanediol diacrylate), EBECRYL 1290 (aliphatic urethane hexaacrylate), EBECRYL 4830 (aliphatic urethane diacrylate with 10% tetraethylene glycol diacrylate), EBECRYL 4833 (aliphatic urethane diacrylate with 10% N-vinyl-2-pyrrolidone), EBECRYL 4866 (aliphatic urethane triacrylate with 30% tripropylene glycol diaacrylate), EBECRYL 8210 (aliphatic urethane diacrylate with no diluent), EBECRYL 8301 (aliphatic urethane hexaacrylate with no diluent), EBECRYL 8402 (aliphatic urethane diacrylate with no diluent), EBECRYL 8405 (aliphatic urethane tetraacrylate with 20% 1,6-hexanediol diacrylate), EBECRYL 8411 (aliphatic urethane diacrylate with 20% isobornyl acrylate), EBECRYL 8800 (aliphatic urethane acrylate with 10% ethoxyethoxyethyl acrylate), EBECRYL 8800-20R (aliphatic urethane acrylate with 20% tripropylene glycol diacrylate and 8-ethoxyethyxyethyl acrylate), EBECRYL 8804 (aliphatic urethane diacrylate with no diluent) and EBECRYL 8807 (aliphatic urethane diacrylate with no diluent) commercially available from Cytec Industries; Sartomer CN-961 E75 (aliphatic urethane diacrylate blended with 25% ethoxylated trimethylol propane triacylate), CN-961H81 (aliphatic urethane diacrylate blended with 19% 2-(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate), and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. Combinations of these materials may also be employed herein.

Aromatic urethanes are commonly understood to mean a urethane acrylate prepared from an aromatic diisocyanate or polyisocyanate, i.e., a diisocyanate in which the isocyanate groups are connected by an aromatic backbone.

Examples of commercially available aromatic urethane acrylates which can be used in the instant invention include, but are not limited to: EBECRYL 220 (aromatic urethane hexaacrylate), EBECRYL 4827 (aromatic urethane diacrylate), EBECRYL 4849 (aromatic urethane diacrylate with 15% 1,6-hexanediol diacrylate), and EBECRYL 6602-20T (aromatic urethane triacrylate) commercially available from Cytec Industries.

Examples of epoxy acrylates, combinations of aliphatic and aromatic urethane acrylates, polyester acrylated and acrylic acrylates commercially available may be found in *RADCURE Energy Curable Resins, Product Guide—Coatings and Inks* available from Cytec Industries and published in 2006, herein incorporated by reference. Examples include but are not limited to: EBECRYL 600 (bisphenol A epoxy diacrylate), EBECRYL 605 (bisphenol A epoxy diacrylate), EBECRYL 645 (modified bisphenol A epoxy diacrylate), EBECRYL 860 (epoxidized soya oil tetraacrylate), EBECRYL 3200 (low viscosity epoxy acrylate), EBECRYL 3411 (fatty acid modified epoxy diacrylate), EBECRYL 3600 (amine modified epoxy diacrylate), and EBECRYL 3720 (bisphenol A epoxy diacrylate) commercially available from Cytec Industries; and CN104 (bisphenol A epoxy diacrylate), CN108 (aromatic epoxy acrylate), CN 109 (bisphenol A epoxy acrylate), CN133 (aliphatic epoxy acrylate trifunctional), and CN186 (aromatic epoxy acrylate) commercially available from Sartomer.

The prepolymer will make up for instance, about 20 wt. % to about 98 wt. %, about 30 to about 90 wt. %, or about 20 to about 80 wt. % of the total weight of the coating, film or adhesive.

Diluents

Diluents for purposes of this invention are radiation curable monomers which can be used in a manner to control the viscosity of the coating formulation. Accordingly, a low viscosity monomer with at least one functional group capable of photoinitiated polymerization may be employed. The amount of diluent added may be for example chosen to adjust the viscosity in a range from 1,000 to 10,000 mPas, i.e. usually for example anywhere from about 10 to about 90, or about 10 to about 80 wt % are used. It is also possible to add no diluent if the prepolymer is of a viscosity that allows for easy handling. The functional group of the monomer diluent is for example the same as that of the oligomer component, for example a (meth)acrylate.

Typical diuents include but are not limited to dipropylene glycol diacrylate, 1,6-hexanediol diacrylate, neopentyl glycol propoxylate diacrylate, tripropylene glycol diacrylate, tripropylene glycol diacrylate, bisphenol A ethoxylate diacrylate, acrylated dipentaerythritol, propoxylated glycerol triacrylate, pentaerythritol triacrylate, pentaerythritol tetracrylate, trimethylolpropane ethoxy triacrylate, trimethylolpropane triacrylate, alkoxylated triacrylate, ditrimethyolpropane tetraacrylate, ditrimethylolpropane tetraacrylate, polyether tetraacrylate and propoxylated glycerol triacrylate.

Other Ethylenically Unsaturated Monomers

The prepolymer may be combined with other ethylenically unsaturated monomers. The ethylenically unsaturated compounds (b) of the coating formulation typically contain one or more olefinic double bonds. They may be low molecular weight (monomeric) or higher molecular weight (oligomeric), such as disclosed in U.S. Pat. No. 7,084,183, incorporated entirely by reference.

Examples of monomers having a double bond are alkyl and hydroxyalkyl acrylates and methacrylates, e.g, methyl, ethyl, butyl, 2-ethylhexyl and 2-hydroxyethyl acrylate, isobornyl acrylate, and methyl and ethyl methacrylate. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having a plurality of double bonds are ethylene glycol diacrylate, propylene glycol diacrylate, neopentyl glycol diacrylate, hexamethylene glycol diacrylate and bisphenol A diacrylate, 4,4'-bis(2-acryloyloxyethoxy) diphenylpropane, trimethylolpropane triacrylate, pentaerythritol triacrylate and pentaerythritol tetraacrylate, vinyl acrylate, divinylbenzene, divinyl succinate, diallyl phthalate, triallyl phosphate, triallyl isocyanurate and tris(2-acryloylethyl)isocyanurate.

Optional Additives

The coating film or adhesive composition also may comprise various additives as needed to alter or enhance certain properties such as, for example, to improve weatherability, components to improve abrasion resistance, additives to enhance appearance, and materials to improve toughness and mechanical properties. Examples of additives that may be used in the coating composition of the present invention include, but are not limited to, photoinitiators; slip agents; leveling agents; wetting agents; adhesion promoters; anti-absorption agents; anti-foaming agents, such as, for example, mixtures of foam destroying polymers and polysiloxanes; accelerators; pigment dispersion aids; anti-blocking agents; anti-caking agents; anti-slip agents; anti-skinning agents; anti-static agents; anti-stripping agents; binders; curing agents; deaerators; diluents; dispersants; dryers; emulsifiers; fillers; flatting agents; flow control agents; gloss agents; hardeners; lubricants; mar resistance aids; whiteners; plasticizers; solvents; stabilizers; surfactants; viscosity modifiers; UV stabilizers; UV absorbers; and water repellants. For example, the coating composition may further comprise finely divided $SiO_2$, $Al_2O_3$, $ZrO_2$, or $TiO_2$ dispersed therein. These materials can modify the viscosity of the coating such that it may be applied easily and can enhance the abrasion resistance of the cured coating.

Curing Agents

The adhesion promoting monomers may be polymerized by conventional means such as radiation, thermal or redox curing with other vinyl monomers and prepolymers to form coatings, films or adhesives.

Radiation for the purposes of the invention includes ultraviolet, visible and infra-red light as well as electronic beam initiation.

The curing agents are typically photoinitiators when the composition is cured via ultraviolet, visible, infrared or electronic beam initiation.

Photoinitiators

Any known photoinitiators may be employed. For example, mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholin-yl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzo-phenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl 2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Mixtures of photoinitiators are envisioned. In particular, use of mixtures of bisacylphosphine oxide photoinitiator and monoacylphosphine oxide photoinitiator or mixtures of α-hydroxyketone initiators and bisacylphosphine oxides as described in U.S. Pat. No. 7,169,826, herein incorporated entirely by reference.

Photoinitiators disclosed in co-pending provisional U.S. application No. 60/999,361, filed on Oct. 17, 2007 and herein incorporated entirely by reference are of particular interest. The photoinitiators disclosed in 60/999,361 are α-hydroxyketone photoinitiators and have chemically bound adhesion promoter groups such as carboxylic acid, phosphonate, or trialkoxy silane. When the adhesion promoting photoinitiators are incorporated into a coating, film or adhesive, the coating adheres strongly to metal surfaces and is effective as a primer for metals.

Surprisingly, the inventors have discovered that by combining α-hydroxyketone photoinitiators with chemically bound adhesion promoter groups such as carboxylic acid, with adhesion promoting monomers (formula I) into epoxy based coatings, films or adhesive compositions may be used on substrates such as aluminum or steel with considerable improved adhesion. This is surprising because while both the adhesion promoting monomer and the adhesion promoting photoinitiator would be expected to increase adhesion to metals, when the two are combined a synergistic improvement in adhesion to the metal is observed. This is especially noticeable on aluminum substrates in epoxy matrices.

The α-hydroxyketone photoinitiators of most interest are those which are substituted by carboxylic acids of formula II or III.

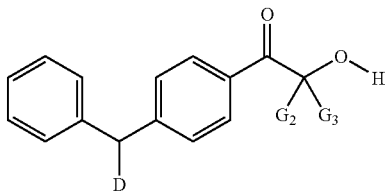

(II)

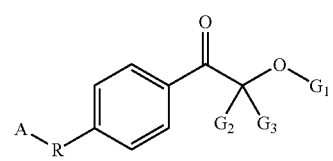

(III)

wherein, $G_2$ and $G_3$ are, independently, $C_1$-$C_4$ alkyl, or taken together, pentamethylene, D is —$R_1$—COOH, $R_1$ is branched or unbranched $C_1$-$C_6$ alkyl which may be further substituted by —OH or —COOH.

R is $C_1$-$C_6$ alkylene, $C_1$-$C_6$ alkylene-oxy or $C_4$-$C_6$ alkylene interrupted by 1 or 2 oxygen atoms, A is a group selected from —(O)$_s$—C(=O)G and —O—CH$_2$—C(=O)G G is selected from the group consisting of phenyl and naphthyl, each being substituted by one to three —COOH, or one or two —C(=O)—O —CH$_2$—C(CH$_3$)(CH$_2$OH)—COOH, and is 0 or 1.

The formulations, in order to enhance the properties of the photoinitiators, may also comprise sensitizer compounds, for example amines.

Photoinitiators typically employed in the present invention are in the range of from about 0.1 to about 10% by weight, based on the total weight of the composition, with about 1 to about 5% by weight being preferable.

Radiation Cure

While curing or polymerization of the coating composition of the invention can be achieved thermally, it is advantageous to cure the coating composition by radiation. It is understood by those skilled in the art that radiation curable coatings, although primarily cured by radiation energy, also may be cured or may have their cure accelerated by heating. Curing may be initiated by any source of ionizing radiation capable of producing free radicals, including gamma radiation, infrared, microwave, but more typically by electron beam or ultraviolet radiation.

In one embodiment, for example, the coating composition is cured by exposure to ultraviolet radiation, typically in the 200-400 nm wavelength range. When polymerization is initiated by ultraviolet radiation, the coating composition will typically include a photoinitiator in accordance with known practices for UV curable compositions.

The curing with radiation may take place under nitrogen or in the presence of air. Curing may also occur in an anaerobic environment.

Generally, Hg medium pressure lamps or/and Fusion D lamps are used to effect UV-curing. Also flash lights are suitable. It is evident that the emission of the lamps is matched with the absorption of the photoinitiator or photoinitiator mixture which is used.

Inhibitors such as hydroquinone, p-methoxyphenol and chelants are incorporated in the liquid anaerobic adhesive to prevent premature polymerization during shipping and storing.

The coatings, films or adhesives are either applied as a liquid or solid such as a powder.

Liquid compositions may for example be preferable as they are more easily applied to a surface or substrate.

The compositions of the present invention may be solvent-based or water-borne systems where the adhesion promoting monomers of formula (I) in combination with (meth)acrylate prepolymers confer improved adhesion to metals.

Water-borne for the purposes of the invention means coating, film or adhesive compositions wherein water is a substantial amount of the composition. Water may be a sole solvent and/or emulsifier. However, the compositions may also contain, in addition to water an organic solvent.

The water content of the compositions is governed substantially by the desired solids content of the composition. Preferred compositions contain about 5 to about 80% by weight of water and may be emulsions, dispersions or solutions.

The coatings, films or adhesives may be applied to surfaces via any method known in the art.

For example, the coating materials can be applied to the substrate by the customary techniques, for example by spraying, dipping, spreading or electrodeposition. In many cases, a plurality of coats may be applied.

The following examples describe certain embodiments of this invention. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents.

$^1$H and $^{31}$P NMR spectra were recorded on a 300 MHz Gemini Spectrometer at ambient temperature.

EXAMPLE 1

3-Acryloyloxypropyl Phosphonic Acid

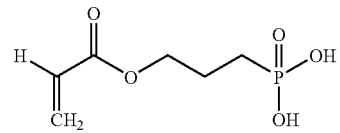

Triethyl phosphite (122.8 g; 0.74 moles) and 1,3-dibromopropane (751.9 g; 3.72 moles) are mixed at room temperature in a round-bottom flask equipped with a reflux condensor and mechanical stirring. The mixture is heated in an oil bath at 160° C. for 30 min, then cooled down and fractionated by vacuum distillation. The first collected fraction is the excess 1,3-dibromopropane. Diethyl 3-bromopropylphosphonate distills at 109-111° C. and 0.77 mbar.

Diethyl 3-bromopropylphosphonate (124.25 g; 0.48 moles), potassium acrylate (54.0 g; 0.49 moles) and DMF (150 ml) are charged into a three-necked flask equipped with mechanical stirrer, thermometer and condenser. The reaction mass is stirred for 3 hours at 80° C., cooled to room temperature, and filtered. The crude is poured into water, extracted with diethyl ether and washed with aqueous NaHCO$_3$. Drying over MgSO$_4$ followed by evaporation of solvent under vacuum gave diethyl 3-acryloyloxypropyl phosphonate as a clear, colorless liquid (110 g; yield 92%). $^1$H NMR (CDCl$_3$, δ ppm) 1.32 (t, 6H, 2CH$_3$—CH$_2$), 1.76-1.89 (m, 2H, CH$_2$—CH$_2$—P), 1.92-2.05 (m, 2H, CH$_2$—CH$_2$—P), 4.04-4.16 (m, 4H, 2CH$_3$—CH$_2$), 4.2 (t, 2H, CH$_2$—O—C(O)), 5.83 (dd, 1H, CH=), 6.11 (dd, 1H, CH=), 6.41 (dd, 1H, CH=). $^{31}$P NMR (CDCl$_3$, δ ppm) 29.49.

To a solution of diethyl 3-acryloyloxypropylphosphonate (31.12 g; 0.124 moles) in CH$_2$Cl$_2$ (85 g) is added a solution of trimethylsilyl bromide (40 g; 0.261 moles) in CH$_2$Cl$_2$ (9.2 g) dropwise at room temperature. The mixture is refluxed for 4 hours. The solvent is evaporated on a rotary evaporator under reduced pressure to afford di(trimethylsilyl) 3-acryloyloxypropylphosphonate as a clear, colorless liquid (42.4 g; purity 95% by GC). $^1$H NMR (CDCl$_3$, δ ppm) 0.006 (s, 9H, CH$_3$—Si), 1.4-1.54 (m, 2H, CH$_2$—P), 1.59-1.72 (m, 2H, CH$_2$—CH$_2$—), 3.91 (t, 2H, CH$_2$—O), 5.55 (dd, 1H, CH=), 5.83 (dd, 1H, CH=), 6.12 (dd, 1H, CH=). $^{31}$P NMR (CDCl$_3$, δ ppm) 13.55.

Di(trimethylsilyl) 3-acryloyloxypropylphosphonate (40 g; 0.118 moles) is dissolved in MeOH (130 ml). The solution is stirred at room temperature for 2 hours. The solvent is vacuum distilled on a rotary evaporator to afford the product as a highly viscous, colorless oil, which solidified after a few days upon storage (22.7 g; yield 99%). $^1$H NMR (DMSO-d$_6$, δ ppm) 1.78-2.00 (m, 4H, CH$_2$—CH$_2$—P), 4.20 (t, 2H, CH$_2$—O), 4.91 (s, 2H, (HO)$_2$—P), 5.94 (dd, 1H, CH=), 6.16 (dd, 1H, CH=), 6.39 (dd, 1H, CH=). $^{31}$P NMR (DMSO-d$_6$, δ ppm) 31.71.

EXAMPLE 2

3-Methacryloyloxypropyl Phosphonic Acid

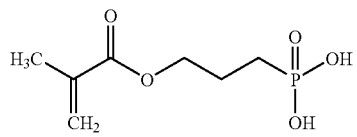

Diethyl 3-bromopropylphosphonate (103.6 g; 0.4 moles), potassium methacrylate ((52.2 g; 0.42 mole) and DMF (100 ml) are charged into a three-necked flask equipped with mechanical stirrer, thermometer and condenser. The reaction mass is stirred for 3 hours at 80° C., cooled to room temperature, and filtered. The crude is poured into water, extracted with diethyl ether and washed with aqueous NaHCO$_3$. Drying over MgSO$_4$ followed by solvent evaporation under vacuum afforded diethyl 3-methacryloyloxypropyl phosphonate as a clear, colorless liquid (96 g; yield 91%; by 94-96° C. @ 0.2 mbar). $^1$H NMR (CDCl$_3$, δ ppm) 1.32 (t, 6H, 2CH$_3$—CH$_2$), 1.75-1.88 (m, 2H, CH$_2$—CH$_2$—P), 1.91-2.05 (m, 2H, CH$_2$—CH$_2$—P), 1.93 (s, 3H, CH$_3$), 4.03-4.16 (m, 4H, 2CH$_3$—CH$_2$—O), 4.18 (t, 2H, CH$_2$—O—C(O)), 5.56 (s, 1H, CH=), 6.09 (s, 1H, CH=). $^{31}$P NMR (CDCl$_3$, δ ppm) 29.54.

To a solution of diethyl 3-methacryloyloxypropylphosphonate (28.2 g; 0.107 moles) in CH$_2$Cl$_2$ (60 g) is added dropwise a solution of trimethylsilyl bromide (34.4 g; 0.225 moles) in CH$_2$Cl$_2$ (22 g) at room temperature. The mixture is refluxed for 5 hours. The solvent is evaporated under vacuum to give di(trimethylsilyl) 3-methacryloyloxypropylphosphonate as a clear, colorless liquid (37.9 g). $^1$H NMR (CDCl$_3$, δ ppm) 0.01 (s, 9H, CH$_3$—Si), 1.41-1.55 (m, 2H, CH$_2$—P), 1.59-1.73 (m, 2H, CH$_2$—CH$_2$—P), 1.66 (d, 3H, CH$_3$), 3.90 (t, 2H, CH$_2$—O), 5.28 (s, 1H, CH=), 5.82 (s, 1H, CH=). $^{31}$P NMR (CDCl$_3$, δ ppm) 13.6.

Di(trimethylsilyl) 3-methacryloyloxypropylphosphonate (34.0 g; 0.096 moles) was dissolved in methanol (115 ml). The solution was stirred at room temperature for 2 hours. The solvent was vacuum distilled on a rotary evaporator to give 3-methacryloyloxypropyl phosphonic acid as a highly viscous, colorless oil (19.9 g; yield 99%). $^1$H NMR (DMSO-d$_6$, δ ppm) 1.52-1.66 (m, 2H, CH$_2$—P), 1.74-1.93 (m, 2H, CH$_2$—CH$_2$—P), 1.87 (s, 3H, CH$_3$), 4.12 (t, 2H, CH$_2$—O), 5.66 (s, 1H, CH=), 6.02 (s, 1H, CH=). $^{31}$P NMR (DMSO-d$_6$, δ ppm) 27.06.

Application Examples

Preparation of Photocurable Resins

An aliphatic urethane resin EBECRYL 8804 and an epoxy resin EBECYRL 605 (supplied by Cytec Industries) are utilized in this study to quantify the influence of the inventive adhesion promoters on the adhesion of photocurable resins to a metal surface.

Both resins are diluted with the reactive diluent 1,6-hexanediol diacrylate (HDDA) to a mixture of 80% resin to 20% diluent to decrease the viscosity.

The formulations series shown in Table 1 are prepared with both resins for later draw-down and UV-curing. The numbers represent parts per whole based on weight. The reference adhesion promoter utilized in this study is a commercial monomer, JPA-514 or 2-hydroxyethyl methacrylate acid phosphate, sourced from Johoku Chemicals. This phosphate monomer is also commercially available from other companies such as Rhodia (Sipomer PAM-100), Kowa, or Sartomer (CD9050). Herein the reference monomer is compared to the adhesion promoting monomer of example 1.

TABLE 1

JPA-514

| Entry | Ebecryl 605[1] | Ebecryl 8804[2] | HDDA[3] | JPA-514 | Example 1 | Iragacure 500[4] | PI 1[5] | PI 2[6] | PI 3[7] |
|---|---|---|---|---|---|---|---|---|---|
| 1 | 80 | | 20 | | | 4 | | | |
| 2 | 80 | | 20 | 1 | | 4 | | | |

TABLE 1-continued

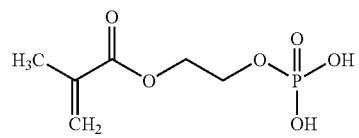

JPA-514

| Entry | Ebecryl 605[1] | Ebecryl 8804[2] | HDDA[3] | JPA-514 | Example 1 | Iragacure 500[4] | PI 1[5] | PI 2[6] | PI 3[7] |
|---|---|---|---|---|---|---|---|---|---|
| 3 | 80 | | 20 | | 1 | 4 | | | |
| 4 | | 80 | 20 | | | 4 | | | |
| 5 | | 80 | 20 | 1 | | 4 | | | |
| 6 | | 80 | 20 | | 1 | 4 | | | |
| 7 | 80 | | 20 | | | | 4 | | |
| 8 | 80 | | 20 | 1 | | | 4 | | |
| 9 | 80 | | 20 | | 1 | | 4 | | |
| 10 | | 80 | 20 | | | | 4 | | |
| 11 | | 80 | 20 | 1 | | | 4 | | |
| 12 | | 80 | 20 | | 1 | | 4 | | |
| 13 | 80 | | 20 | | | | | 4 | |
| 14 | 80 | | 20 | 1 | | | | 4 | |
| 15 | 80 | | 20 | | 1 | | | 4 | |
| 16 | | 80 | 20 | | | | | 4 | |
| 17 | | 80 | 20 | 1 | | | | 4 | |
| 18 | | 80 | 20 | | 1 | | | 4 | |
| 19 | 80 | | 20 | | | | | | 4 |
| 20 | 80 | | 20 | 1 | | | | | 4 |
| 21 | 80 | | 20 | | 1 | | | | 4 |
| 22 | | 80 | 20 | | | | | | 4 |
| 23 | | 80 | 20 | 1 | | | | | 4 |
| 24 | | 80 | 20 | | 1 | | | | 4 |

[1]Resin composed of 75% bisphenol A epoxy diacrylate diluted with 25% TPGDA.
[2]Aliphatic urethane diacrylate resin.
[3]1,6-Hexanediol diacrylate.
[4]Irgacure 500 is 1:1 mixture by weight of benzophenone and Irgacure 184 or 1-hydroxycyclohexyl phenyl ketone.
[5]Photoinitiator 1 is 3,3'-bis[{2-[4-(1-hydroxycyclohexylcarbonyl)phenyl]ethoxy}carbonyl]benzophenone-4,4'-dicarboxylic acid.
[6]Photoinitiator 2 is 3-[4-((1-hydroxycyclohexyl)carbonyl))phenyl]-3-phenylpropanoic acid.
[7]Photoinitiator 3 is a 1:2.5 mixture by weight of Photoinitiator 2 and Irgacure 500.

After combining the various components, all formulations are shaken overnight to ensure complete homogeneity. Care was taken to prevent exposure to ambient light and moisture.

Draw Down of Formulations onto Metal Substrates & UV-Cure:

Two metal substrates, aluminum and cold rolled steel, are utilized in this study to elucidate the differences in adhesion promoting ability on different metal surfaces. The aluminum plates (#3003; polished size 03×04×025) and the cold rolled steel plates (unpolished size 03×04×025) are purchased from ACT laboratories for use as curing substrates. The plate surfaces are rinsed with methanol, cleaned with lint free wipes and dried with air to ensure a clean surface.

The draw down of the resins onto the substrate surfaces is performed with a Gardco Automatic Drawdown Machine, at a speed of 1.5 inches/s, a stroke length of 6 inches, and with a #10 bar for a targeted 1 mil wet thickness. Each formulation is drawn down on both aluminum and cold rolled steel substrate plates. Following the draw down, the plates are UV-cured using a Fusion UV-Cure Lamp. Each plate is passed under a 9 mm×6 inch H-bulb (Hg vapor) three times at a rate of 17 ft/min. After UV exposure the substrates are allowed to cure overnight before cross-hatch analysis is performed.

Cross-hatch Testing of Photocured Resins

Substrates are crosscut with a BYK Gardner-Cross-Cut-Tester Kit fitted with a 2 mm cross-hatcher. The resins are scored perpendicularly to form a 8×8 cross-hatch with 36 2 mm×2 mm boxes. After scoring, scotch tape (3M tape#10) is pressed onto the cross-hatch grid utilizing a spatula to ensure uniform adherence. With a swift, uniform pulling motion, the tape is quickly pulled off the substrate. Adhesion is expressed as the percent from the total cross-hatch surface where the resin has not been pulled off by the tape (ISO & DIN 2409). Thus a higher percentage indicates better adhesion. Degree of surface cure is evaluated visually. The adhesion data and observations are presented in Table 2.

TABLE 2

| Resin entry | Metal substrate | Base resin | Adhesion promoter | PI | % Adhesion dry | Surface cure |
|---|---|---|---|---|---|---|
| 1 | Aluminum | Ebecryl 605 | | Irgacure 500 | 0 | hard |
| 2 | | | JPA-514 | | 15 | tacky |
| 3 | | | Example 1 | | 0 | tacky |
| 4 | | Ebecryl 8804 | | | 25 | hard |
| 5 | | | JPA-514 | | 50 | hard |
| 6 | | | Example 1 | | 95 | hard |

TABLE 2-continued

| Resin entry | Metal substrate | Base resin | Adhesion promoter | PI | % Adhesion dry | Surface cure |
|---|---|---|---|---|---|---|
| 1 | Steel | Ebecryl 605 | | | 5 | hard |
| 2 | | | JPA-514 | | 30 | hard |
| 3 | | | Example 1 | | 100 | hard |
| 4 | | Ebecryl 8804 | | | 10 | hard |
| 5 | | | JPA-514 | | 100 | hard |
| 6 | | | Example 1 | | 95 | hard |
| 7 | Aluminum | Ebecryl 605 | | PI 1 | 0 | hard |
| 8 | | | JPA-514 | | 0 | hard |
| 9 | | | Example 1 | | 5 | slightly tacky |
| 10 | | Ebecryl 8804 | | | 75 | tacky |
| 11 | | | JPA-514 | | 95 | tacky |
| 12 | | | Example 1 | | 98 | tacky |
| 7 | Steel | Ebecryl 605 | | | 25 | hard |
| 8 | | | JPA-514 | | 10 | hard |
| 9 | | | Example 1 | | 97 | hard |
| 10 | | Ebecryl 8804 | | | 93 | tacky |
| 11 | | | JPA-514 | | 95 | tacky |
| 12 | | | Example 1 | | 98 | tacky |
| 13 | Aluminum | Ebecryl 605 | | PI 2 | 0 | hard |
| 14 | | | JPA-514 | | 0 | tacky |
| 15 | | | Example 1 | | 20 | tacky |
| 16 | | Ebecryl 8804 | | | 5 | tacky |
| 17 | | | JPA-514 | | 95 | tacky |
| 18 | | | Example 1 | | 99 | tacky |
| 13 | Steel | Ebecryl 605 | | | 5 | hard |
| 14 | | | JPA-514 | | 7 | hard |
| 15 | | | Example 1 | | 70 | hard |
| 16 | | Ebecryl 8804 | | | 5 | tacky |
| 17 | | | JPA-514 | | 97 | tacky |
| 18 | | | Example 1 | | 98 | tacky |
| 19 | Aluminum | Ebecryl 605 | | PI 3 | 0 | hard |
| 20 | | | JPA-514 | | 5 | hard |
| 21 | | | Example 1 | | 22 | hard |
| 22 | Steel | Ebecryl 605 | | | 0 | hard |
| 23 | | | JPA-514 | | 5 | hard |
| 24 | | | Example 1 | | 98 | hard |

The experimental data show that for the same resin type, adhesion to the metal surface may change from poor to good to excellent depending on the choice of adhesion promoter and photoinitiator. Both adhesion promoters used, JPA-514 and the phosphonic acid acrylate of example 1, are directly incorporated into the resin by radical polymerization. The pendant phosphorus-containing functional groups, acid phosphate in JPA-514 and phosphonic acid in example 1, have the ability to adhere to metal surfaces thus increasing adhesion. In most cases adhesion is improved when a promoter is used, with a clear trend for a significant increase in adhesion when the phosphonic acid acrylate of example 1 is employed.

The epoxy-based resins of entries 1-3, 7-9, 13-15 and 19-21 do not adhere particularly well on aluminum. Minimal or no improvement in adhesion is attained when JPA-514 is added to the UV-curable formulation. However, the novel adhesion promoter of example 1 consistently increases the adhesion on aluminum with up to 22% resin retained on the cross-hatched metal substrate in most cases. On the cold rolled steel substrates JPA-514 increases adhesion to a maximum of 30% resin retention, whereas the novel phosphonic acid acrylate of example 1 improves adhesion significantly, to between 70 and 100% resin retention in all cases.

The addition of the phosphorus-containing monomers to the aliphatic urethane-based resins of entries 4-6, 10-12, 16-18 and 22-24, improves the adhesion performance of the cured coatings considerably. On aluminum JPA-514 increases adhesion to between 50 to 95% resin retained, whereas the novel adhesion promoter of example 1 gives close to 100% adhesion in all cases. On the cold rolled steel substrates both the phosphate and phosphonic acid monomers give excellent adhesion.

An adhesion improvement effect is observed when using photoinitiator PI 1, which is chemically modified with carboxylic groups capable of engaging in interactions with the metal surface. The effect is particularly noticeable in the urethane-based resin where it increases adhesion to 75% retention of the cross-hatched coat on aluminum and 93% retention on the cold rolled steel, respectively.

We claim:

1. A coating, film or adhesive composition on a surface which coating, film or adhesive which coating, film or adhesive comprises:
   a) at least a (meth)acrylate prepolymer,
   b) an adhesion promoting monomer of formula (I) or mixtures thereof

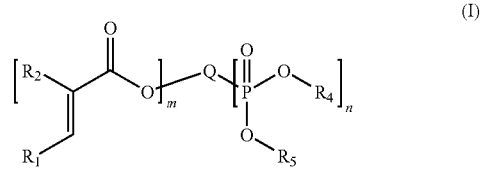

(I)

wherein
Q is at least a divalent linking radical selected from the group consisting of one or more of a linear or branched $C_1$-$C_{10}$ alkyl, linear $C_1$-$C_{18}$ alkylene, $C_6$-$C_{12}$ arylene, or linear or branched aralkylene;
wherein the linear or branched $C_1$-$C_{10}$ alkyl, $C_6$-$C_{12}$ arylene, linear or branched aralkylene;

linking group is unsubstituted or substituted by one or more $C_1$-$C_4$ alkyl, $C_1$-$C_4$ haloalkyl, halogen, hydroxyl or $C_1$-$C_4$ alkoxy;

or

Q is a $C_2$-$C_{12}$ alkylene interrupted by one or more —O—, —S—, —O(CO)—, —S(CO)—, —OC(O)O—, or —C(O)—;

m is 1 to 2;

n is 1 to 2;

$R_1$ and $R_2$ are independently hydrogen or linear or branched $C_1$-$C_4$ alkyl;

$R_4$ and $R_5$ are independently hydrogen or linear or branched $C_1$-$C_4$ alkyl; and c) a curing agent, wherein the curing agent is a photoinitiator and is a compound of formula (II) or (III) or mixtures thereof

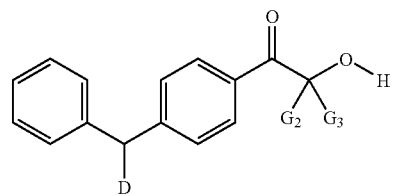
(II)

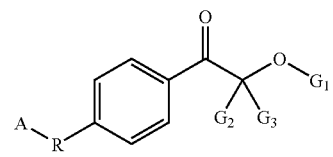
(III)

wherein, $G_1$ is H, $G_2$ and $G_3$ are, independently, $C_1$-$C_4$ alkyl, or taken together, pentamethylene, D is —$R_1$—COOH, $R_1$ is branched or unbranched $C_1$-$C_6$ alkyl which may be further substituted by —OH or —COOH, R is $C_1$-$C_6$ alkylene, $C_1$-$C_6$ alkylene-oxy or $C_4$-$C_6$ alkylene interrupted by 1 or 2 oxygen atoms, A is a group selected from —(O)$_s$—C(=O)G and —O—CH$_2$—C(=O)G s is 0 or 1, G is phenyl substituted at the 2 position by a group C(=O)OH and at the 4 or 5 position by a group

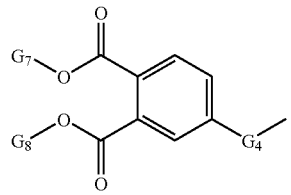

$G_4$ is —(C=O)—, one of $G_7$ or $G_8$ is —H, the other is —H or —Z, and

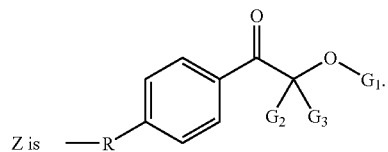

Z is —R—

2. The composition according to claim 1, wherein the (meth)acrylate prepolymer is an aliphatic or aromatic urethane (meth)acrylate or an epoxy (meth)acrylate.

3. The composition according to claim 1, wherein the (meth)acrylate prepolymer is an aliphatic urethane (meth)acrylate.

4. The composition according to claim 1, wherein $R_4$ and $R_5$ are independently hydrogen.

5. The composition according to claim 1, wherein Q is $C_3$-$C_{18}$ alkylene.

6. An irradiation cured coating, film or adhesive on a surface comprising the composition according to claim 1.

7. An irradiation cured coating, film or adhesive according to claim 6, wherein the surface is a metal and the metal is aluminum or steel.

8. An irradiation cured coating, film or adhesive according to claim 7, wherein the metal is flexible.

* * * * *